United States Patent [19]
Tamborello et al.

[11] Patent Number: 5,814,380
[45] Date of Patent: Sep. 29, 1998

[54] COLLAPSIBLE LAWN ORNAMENT AND METHOD

[75] Inventors: Gregory J. Tamborello, Tampa, Fla.; Robert D. Berkley, Haughton, La.

[73] Assignee: Sport-Flex, Inc., Bossier City, La.

[21] Appl. No.: 908,329

[22] Filed: Aug. 7, 1997

Related U.S. Application Data

[60] Provisional application No. 60/038,272 Feb. 19, 1997.

[51] Int. Cl.⁶ .................................................. A47G 35/00
[52] U.S. Cl. .................................. 428/9; 428/12; 428/58; 428/99; 446/487
[58] Field of Search .................................... 428/9, 12, 58; 446/487

Primary Examiner—Alexander Thomas
Attorney, Agent, or Firm—Richard P. Crowley

[57] ABSTRACT

A three-dimensional heat and vacuum molded ornament, such as a snowman figure, formed of thermoplastic foam sheet material with heat sealed abutting edges, in a molding process. The ornament adapted to move, by the use of hand pressure, between a non-collapsed upright, use position and a collapsed, reduced-height position for shipment or storage.

20 Claims, 5 Drawing Sheets

COLLAPSIBLE LAWN ORNAMENT AND METHOD

REFERENCE TO PRIOR APPLICATION

This patent application is based on and claims the benefit of U.S. Provisional patent application Ser. No. 60/038,272, filed Feb. 19, 1997.

BACKGROUND OF THE INVENTION

Lawn ornaments generally comprise a wide variety of two- or three-dimensional objects to decorate the lawn or outside open area of a residence of other building.

Lawn ornaments may be permanently displayed for decorative purposes, such as pink flamingoes on wire supports; or may be used for particular festive celebrations, like Christmas, Thanksgiving, Halloween, and Easter. The ornaments may be animals; like reindeer, ducks, turkeys, flamingoes, etc.; or figures; like elves, snowmen, toy soldiers; or inanimate objects; like candlesticks, candy canes, sleighs, etc.

Generally, lawn ornaments are formed of low silhouette ornaments or three-dimensional ornaments formed of hard, blow-molded polymers. The hardness and bulk of these lawn ornaments make the storage, packaging and shipment of such ornaments quite difficult and expensive. It is desirable to provide for a new and improved type of three-dimensional lawn ornament which is easily collapsible for packaging, shipment and storage, but which is readily and easily restored to and placed in position for use and display, and is of a lightweight material.

SUMMARY OF THE INVENTION

The invention relates to a foam sheet-formed ornament and method; the ornament, such as a snowman, adapted to move between a collapsible position for packaging, shipment and storage, and an upright, non-collapsible use or display position.

The ornament of the invention is prepared by vacuum-forming, in a vacuum mold under heat and pressure, using twin mold sections, usually half sections, of a thermoplastic flexible foam sheet material. The foam sheet material comprises a closed-cell, thin, e.g., about 3/16 inch to ½ inch thick, material, usually composed of a lightweight, e.g., 1 to 6 pounds per square inch (psi), foam sheet material, such as of an olefinic polymer, like polyethylene thermoplastic or a vinyl sheet material. The two foam sheets, which may be of the same thickness and material, but not necessarily so, are introduced into a vacuum mold to vacuum-form the selected dimensional shape of the ornament, such as a snowman, with the abutting edges of the sheet foam material thermo-sealed together in the forming operation. The so formed ornament usually is formed with a small air vent hole to permit the entry/expel of air after formation. Optionally, the bottom of the base of the ornament so formed, like a snowman, may be removed by cutting out a section for the insertion of a stand, electric lights for enhanced display, or to make the hand pressure collapse of the ornament when expelling air easier.

In the method of preparing the ornament, vacuum mold sections are placed in an open position and two flexible, thermoplastic foam sheet materials are inserted in the open mold. The mold is closed and the foam sheet materials are vacuum-formed under heat, for example, 200° to 350° F., and vacuum pressure and formed into the selected ornament shape. In the molding process, the abutting edges of each of the foam sheet materials are heat-sealed together to form the three-dimensional figure, e.g., a snowman.

Typically and optionally, the ornament is vacuum-molded with one or more small air vent holes in the base. Also, optionally, the ornament may be molded with a plurality of grommet holes, for example, 4 to 6 uniformly spaced about the base, to receive ground wires to hold the ornament in an upright use position, for example, as a lawn ornament. When grommet holes are used, metal or plastic ring grommets may be inserted or molded in place, and the ornament would include a suitable plurality of securing wires, such as, sheet metal wires with a J-hook, or securing means at one end for attachment to the grommet holes and with the other end of the wire adapted to be inserted into the ground or to ground stakes. Usually a bottom section of the base of the ornament is removed after molding to permit the optional insertion of an internal support stake, or internal lights.

The selection of the molding temperature is preferably based on the thickness, foam density and the selected thermoplastic foam material to insure a good heat-formed peripheral edge seal. The ornament, after molding, should have sufficient rigidity to be maintained in an upright or use position, but yet be easily collapsible on itself, or its component sections, by hand pressure to a collapsed or non-use position.

The ornaments of the invention are generally employed as lawn ornaments, but it is recognized that the ornaments or molded objects may be used and employed for a variety of purposes and uses alone and in combination with other accessories and components. A typical three-dimensional figure ornament would comprise two, three, or four or more molded sections, such as, spherical sections, each progressively smaller and extending from an outwardly flared base section. The spherical sections are designed to form the figure in use and to be progressively collapsed within each larger section into the non-use collapsed position.

In one preferred embodiment, the figure ornament is a designed snowman with three spherical sections on a base, representing the head, upper body and lower body sections. Of course, the exterior surface design of the ornament may vary as desired.

The lightweight, flexible, soft, foam sheet vacuum-formed ornament thus permits the ornament to be sufficiently sturdy to be used as a lawn ornament or for display, but permits, on the application of hand pressure, typically in a single direction, collapsing easily the foam structure onto or within itself for storage, packaging and shipment. The foam sheet is sufficiently sturdy and yet flexible, so that the structure may, with little hand pressure assistance, pop or be slightly stretched into its original three-dimensional use form.

In one embodiment, to be illustrated, a three-dimensional, foam sheet vacuum-formed snowman design can be formed composed of a base and three generally spherical sections of progressively lesser dimensions, i.e. lower body, upper body and head. The arrangement permits the easy collapse of the snowman ornament (which has a large opening in the base) by the use of axial or longitudinal hand pressure on the top of the head, so that each section collapses within the lower section to provide a collapsed, lightweight snowman of significantly reduced height and of little weight for easy insertion in a cardboard box for storage or shipment. Other ornamental figures may be similarly prepared and collapsed with or into itself or within the base of the figure or if required, easily collapsed or folded up, without damage, for later easy opening and repositioning of the ornament.

The invention shall be described for the purposes of illustration only, in connection with certain embodiments; however, it is recognized that those persons skilled in the art may make various additions, improvements, modifications and changes to the illustrated embodiments, without departing from the spirit and scope thereof.

DESCRIPTION OF THE EMBODIMENTS

Figure 1:
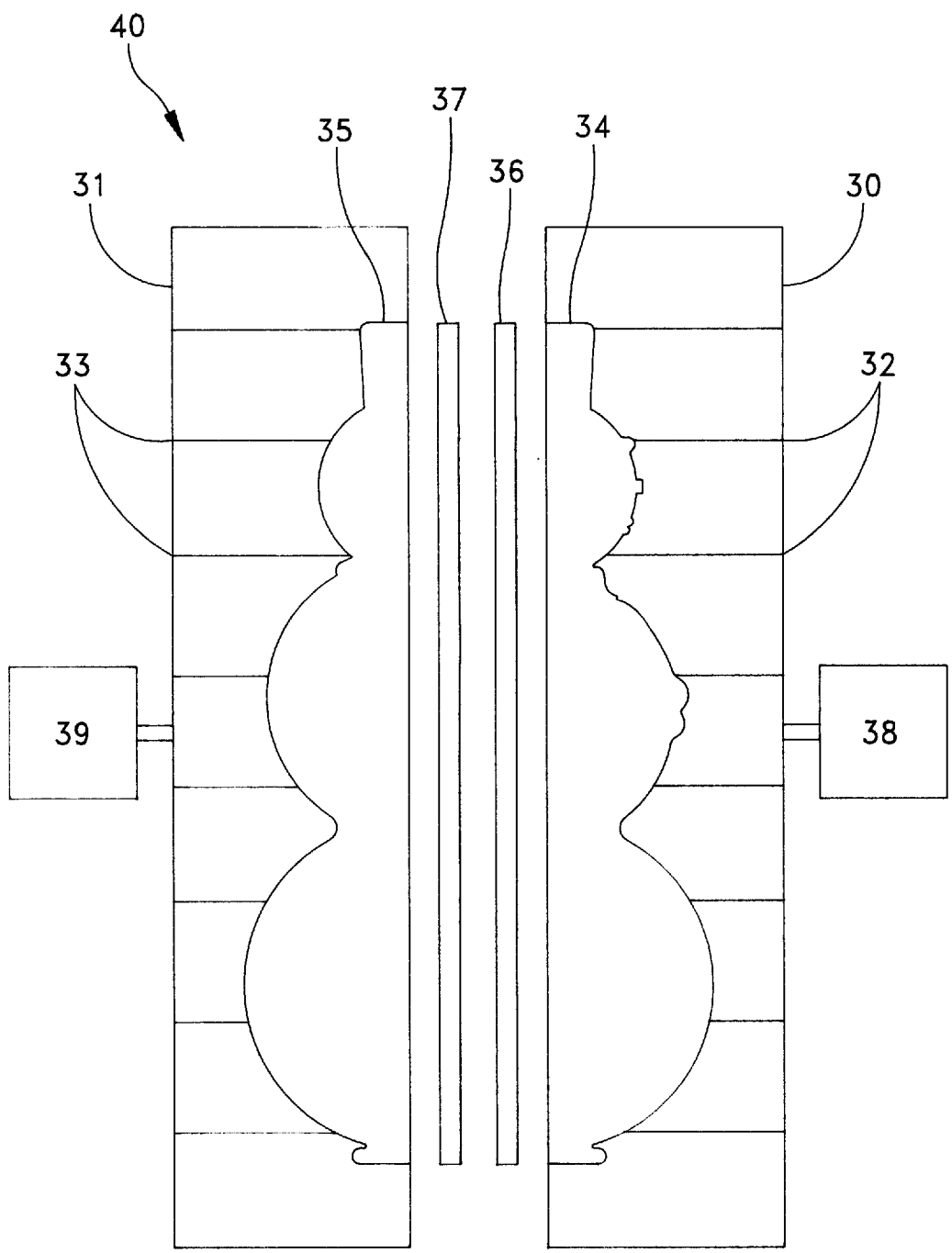
FIG. 1 is an illustrative schematic illustration of the use of a vacuum-forming mold with two foam sheets to form a snowman ornament.

FIG. 1 shows a vacuum-forming electric-heated mold assembly 40, used in forming a foam snowman ornament 10. Mold half 30, with mold form 34, has vacuum pump 38, which removes air through ducts 32. Mold half 31, with mold form 35, has vacuum pump 39, which removes air through ducts 33. Two sheets 36 and 37 of lightweight, closed-cell, 5/16" polyethylene flexible foam are shown prior to vacuum molding.

In operation, the mold halves, 30 and 31, are closed, the mold forming an interior mold cavity of the snowman and the mold heated, and a vacuum drawn by pumps, 38 and 39, to draw the foam sheets to the respective interior mold surfaces, whereby the foam sheet edges are heat-sealed together under heat and pressure and the ornament 10 formed in the mold. After formation, the mold 40 is placed in an open position and molded ornament 10 ejected or removed, and a section; for example, circular section, cut from the bottom of the base 22.

In one example, a low density polyethylene, closed-cell, foam sheet material of about 2 to 4 pounds per square inch (psi) is used at a thickness of about 5/16 inch, with a heated mold temperature of about 290° to 310° F., to form a molded snowman lawn ornament.

Figure 4:
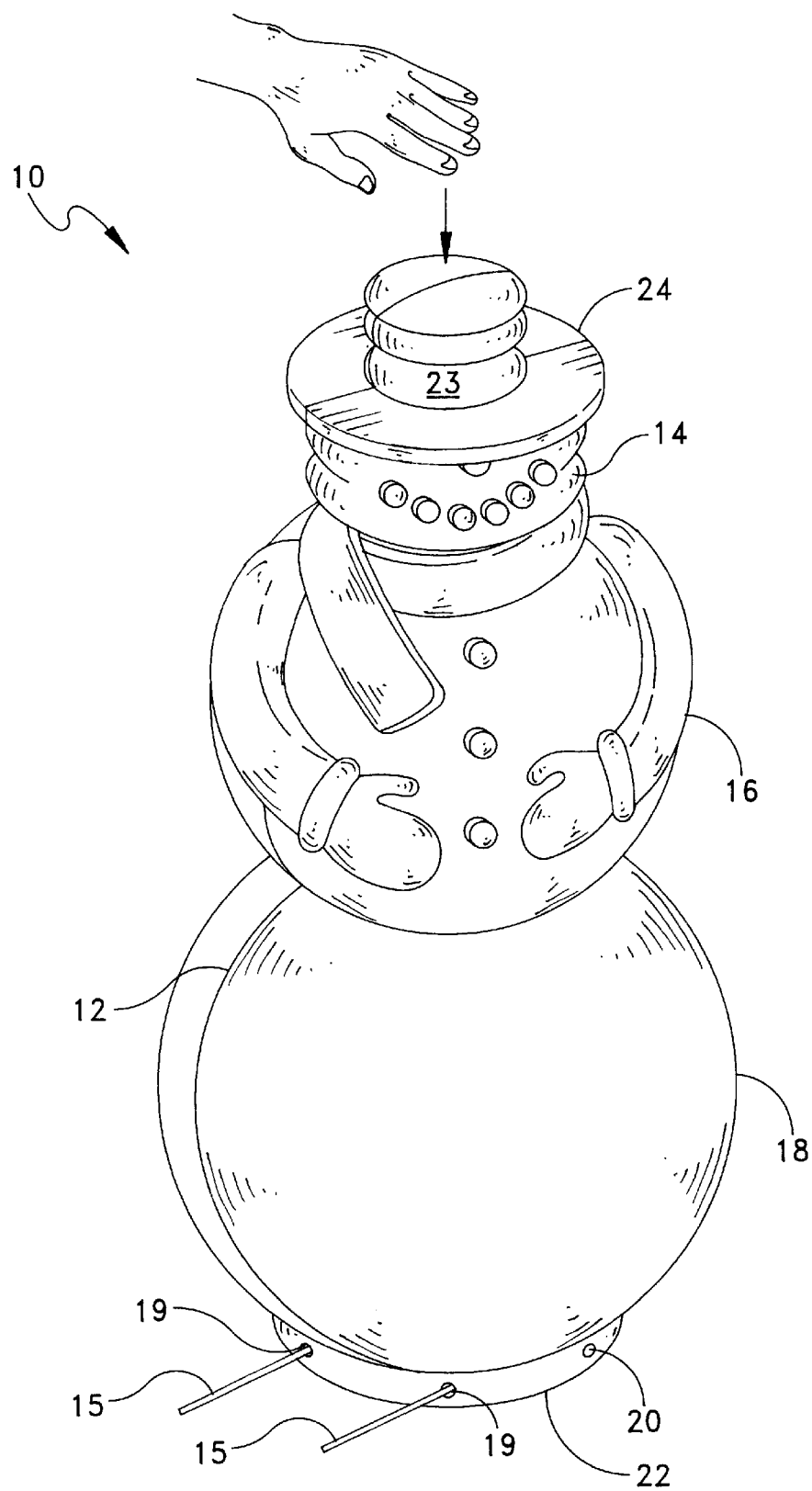
FIG. 4 is a perspective view showing the snowman ornament of FIG. 2 in a partially collapsed position, with the head collapsed.

As illustrated, the snowman 10 in the example has been molded with four grommet holes, with reinforcing grommet rings 19 in the base 22 for the use of J-type metal securing wires 15, as illustrated, to hold the ornament in a use position as shown in FIG. 4.

Figure 2:
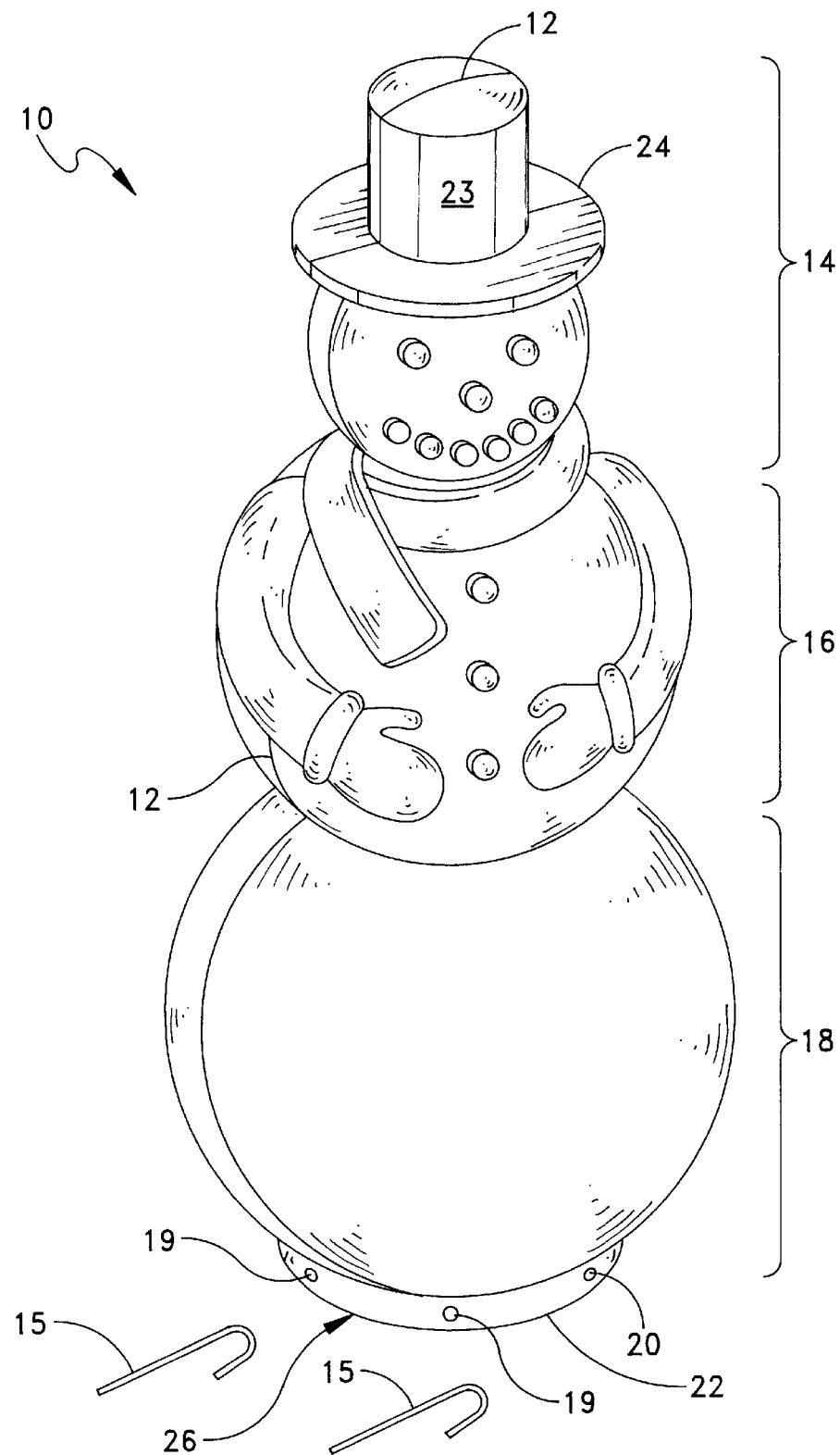
FIG. 2 is a perspective view of a vacuum-formed foam sheet snowman ornament.

FIG. 2 shows one preferred embodiment of the invention, a snowman 10, in perspective view. The two foam sheets of FIG. 1, 36 and 37, have been formed into front 36 and back 37 molded sheet halves of the snowman, secured together by peripheral seam 12. The snowman has a head section 14, upper body section 16 and lower body section 18, with a base 22 having a vent hole 20 and base opening 26. The head section has a hat 23 with a separate, detachably secured rim 24 thereon. The snowman 10 includes four (4) uniformly-spaced, reinforced, grommet holes 19 in the base 22 with J-shaped support wires 15 shown separately.

Figure 3:
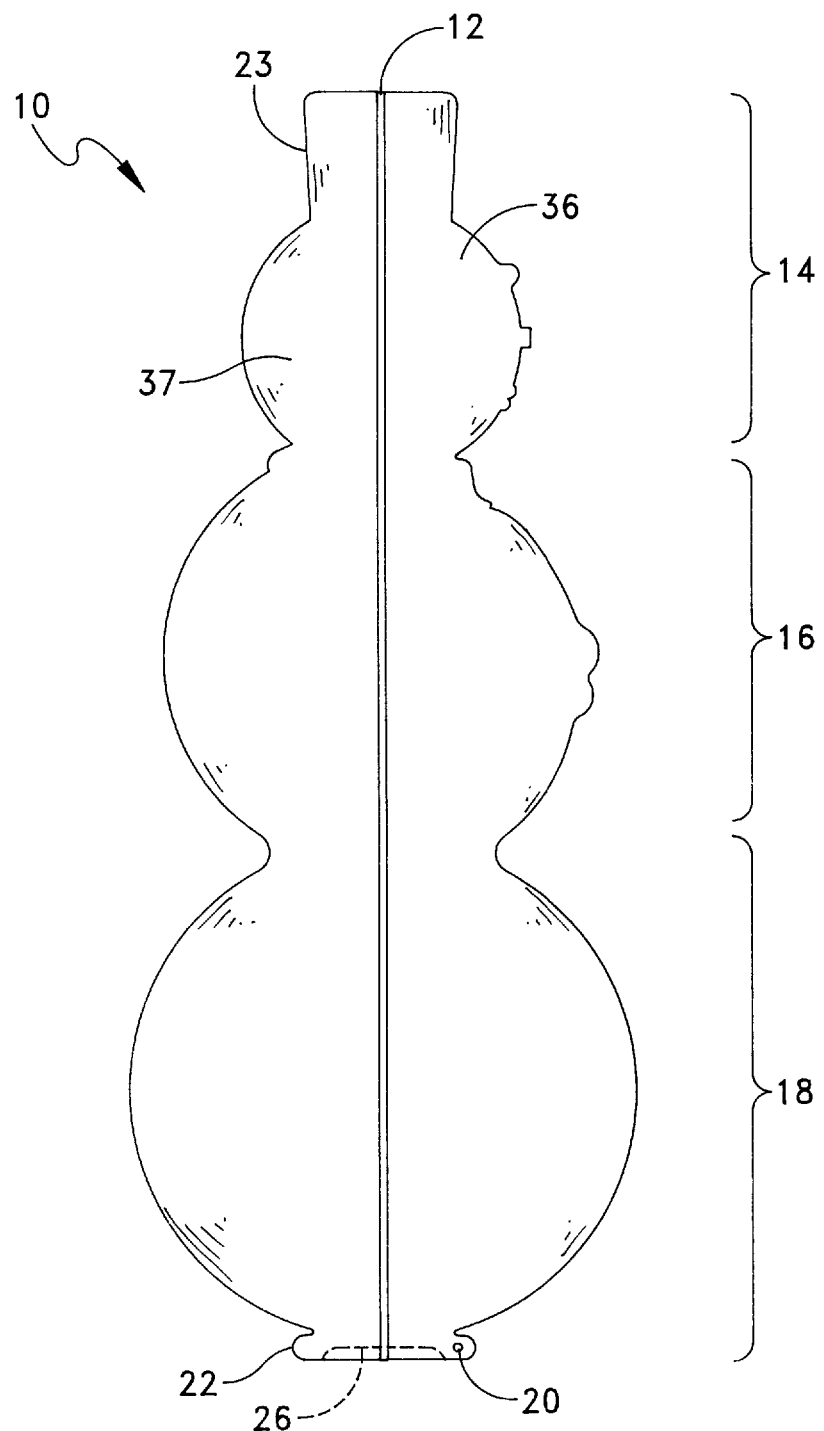
FIG. 3 is a side sectional view of the vacuum-formed snowman ornament of FIG. 2.

FIG. 3 shows a side sectional view of the snowman 10 of FIG. 2 with front 36 and back 37 halves being secured together with a seam 12. The drawing shows the vent hole 20 and base opening 26 at the lower end of the lower body section 18.

Figure 5:
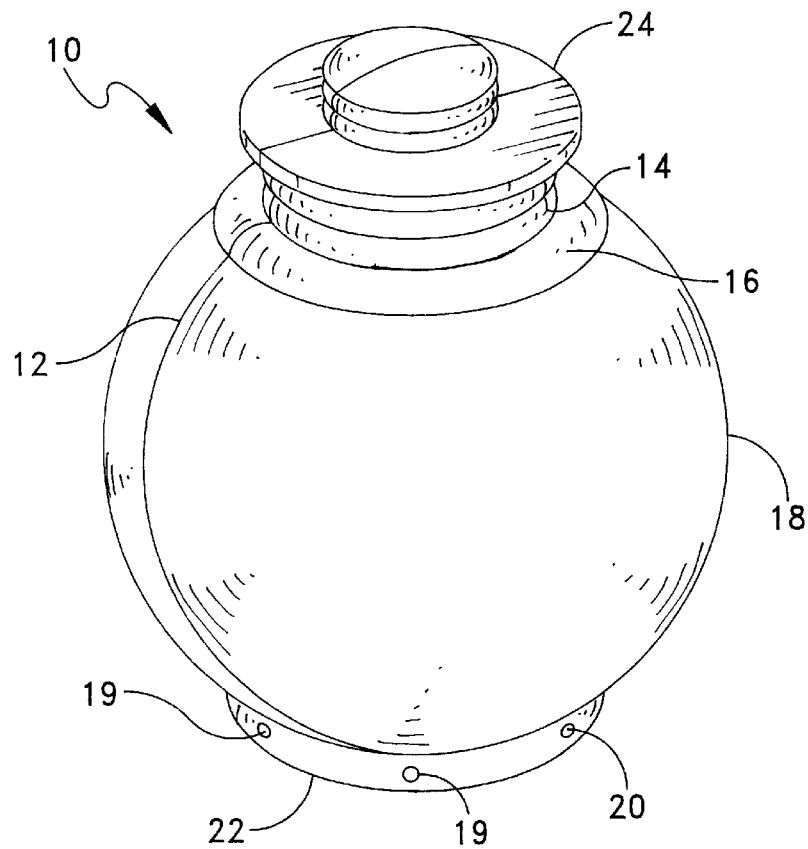
FIG. 5 is a perspective view showing the snowman ornament of FIG. 2 in a partially collapsed position, with the head and upper body collapsed.
Figure 6:
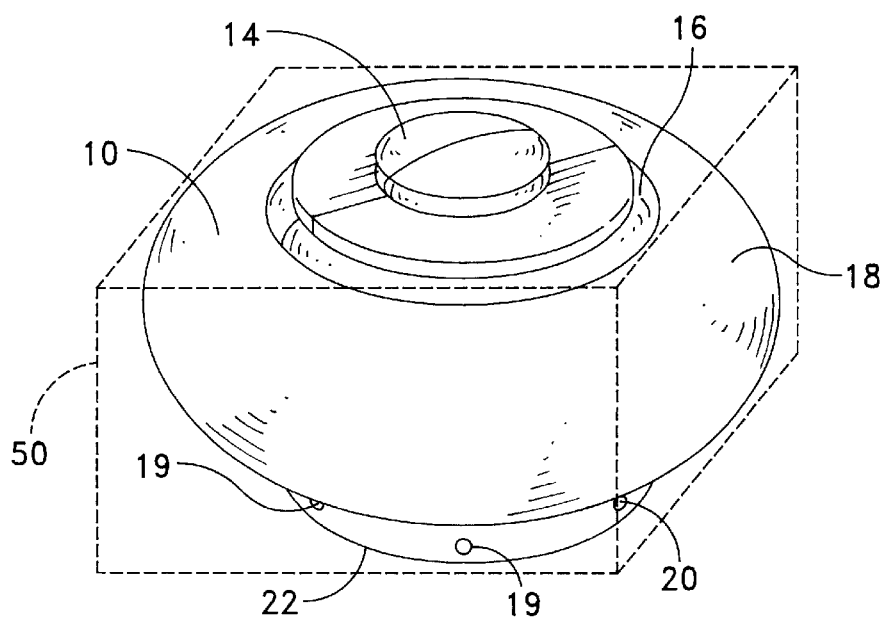
FIG. 6 is an illustrative schematic view of the fully collapsed snowman ornament within a package, the package shown in dotted lines.

FIGS. 4, 5 and 6 show the stages of compression of the snowman 10. In FIG. 4, the hat 23, is compressed by hand or other pressure down onto the head section 14. In FIG. 5, the head section 14 is further compressed until it folds into the upper body section 16. The upper body section 16, then compresses into the cavity of the lower body section 18. FIG. 6 shows the snowman of the invention 10, in a fully compressed state inside a box 50 (shown in dotted lines). Head section 14 and upper body section 16 are compressed by hand pressure into the lower body section 18, which is then further compressed and folded in on itself until it fits into a box 50 for storage or shipping. FIG. 4 also illustrates the J-shaped support wires 15 hooked into grommet holes 19 to support the snowman 10 on the ground.

When ready for use, the snowman 10 is simply and easily removed from the box 50 in a compressed form and returned to its expanded shape by the user expanding the sections of the snowman 10. In the upright use position, the base opening 26 may be placed over a support-like post, or a weight inserted therein, to hold the ornament 10 in position. Optionally, the ornament 10 may be secured to the ground by stakes, such as tent stakes, that can be inserted through the foam and into the ground or other base surface.

The invention comprises a three-dimensional object, such as a lawn ornament, formed in a vacuum molding process, with two foam sheet half sections to provide a hollow, vacuum-formed ornament of a selected exterior shape and design and with the abutting foam sheet edges secured together by heat and pressure in the process. The foam material comprises a closed-cell, flexible, thin, e.g. ¼ inch to ½ inch, thermoplastic, e.g., olefin, polymer, like polyethylene. The formed object is adapted to move between an upright use position and by slight hand pressure to be collapsed (axially or by folding) to a substantially smaller volume collapsed position, greater than 50–70%, and yet to reverse back easily to an upright use position by slight hand pressure.

What is claimed is:

1. A collapsible three-dimensional ornament, which ornament comprises:

a) an ornament, comprised of two sheets of closed-cell, flexible, thermoplastic, foam sheet material, heat sealed together at abutting edges of the sheet material and forming a three-dimensional ornament of selected design;

b) the ornament, comprised of a plurality of connected head, upper body, lower body and base sections, the head, upper body and lower body sections of progressively larger size;

c) an air vent in the ornament to permit the entry and exhaust of air from the interior of the ornament; and d) the ornament, characterized and adapted to move between a use position and a reduced-height, collapsed position, by the application of hand pressure on the head section, to collapse the head and upper body into the lower body section, and to permit the use of hand pressure to assist the collapsed position of the ornament to resume the original use position.

2. The ornament of claim 1 wherein the foam sheet material ranges in thickness from about 3/16 inch to ½ inch.

3. The ornament of claim 1 wherein the foam material has a foam density of about 1 to 6 pounds per square inch (psi).

4. The ornament of claim 1 wherein the head, upper body and lower body sections comprise generally spherical sections.

5. The ornament of claim 4 which is designed in the representation of a snowman figure.

6. The ornament of claim 1 which includes said air vent in the base of the ornament.

7. The ornament of claim 1 which is characterized by a generally circular, cut out section in the bottom of the base.

8. The ornament of claim 1 which includes a plurality of grommet holes and includes support wires adapted to fit at one end in the grommet holes and at the other end to be secured to the ground.

9. The ornament of claim 1 wherein the foam sheet material comprises polyethylene.

10. A package system which includes the ornament of claim 1 in a collapsed position and a package containing the collapsed ornament.

11. A method for preparing a collapsible, flexible, three-dimensional ornament,; adapted to move between a non-collapsed use position and a collapsed position, which method comprises:
  a) inserting a pair of closed-cell, flexible, thermoplastic, foam sheet materials into a molded cavity having an interior surface of selected design, between mold parts, in an open mold position;
  b) closing the mold parts to a closed mold position and subjecting the sheet material to vacuum forming under sufficient heat and vacuum pressure to form a three-dimensional ornament with a selected exterior surface design and having abutting edges of the foam sheet material heat-sealed together, the ornament comprised of:
    i) a plurality of connected head, upper body, lower body and base sections, the head, upper body and lower body sections of progressively larger size;
    ii) an air vent in the ornament to permit the entry and exhaust of air from the interior of the ornament; and
    iii) the ornament, characterized and adapted to move between a use position and a reduced-height, collapsed position by the application of hand pressure on the head section, to collapse the head and upper body into the lower body section, and to permit the use of hand pressure to assist the collapsed position of the ornament to resume the original use position; and
  c) opening the mold and recovering the ornament.

12. The method of claim 11 wherein the foam sheet material comprises a foam density of about 1 to 6 pounds per square inch (psi) and has a thickness of about 3/16 inch to 1/2 inch.

13. The method of claim 11 which includes heating the closed mold to a temperature of about 200° to 350° F.

14. The method of claim 11 wherein the foam sheet material comprises foam polyethylene.

15. The method of claim 11 which includes molding into the base of the ornament a plurality of grommet holes and an air vent hole.

16. The method of claim 11 which includes cutting out a section of the bottom of the base after recovery of the ornament.

17. The method of claim 11 which includes securing the ornament to the ground employing a plurality of support wires secured to the base.

18. The method of claim 11 which includes collapsing the ornament by axial hand pressure on the head section.

19. The method of claim 18 which includes placing the collapsed ornament into a container.

20. The ornament produced by the method of claim 11.

* * * * *